US008700298B2

(12) United States Patent
Meador et al.

(10) Patent No.: US 8,700,298 B2
(45) Date of Patent: Apr. 15, 2014

(54) TAILORED ARRIVALS ALLOCATION SYSTEM CLEARANCE GENERATOR

(75) Inventors: Suzanne Elise Meador, Seattle, WA (US); Robert W. Mead, Covington, WA (US); Ferdinando Dijkstra, Amtelveen (NL); Christie Marie Maldonado, Renton, WA (US); Gregory T. Saccone, Kirkland, WA (US); Bradley David Cornell, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 716 days.

(21) Appl. No.: 12/895,400

(22) Filed: Sep. 30, 2010

(65) Prior Publication Data

US 2012/0083997 A1 Apr. 5, 2012

(51) Int. Cl.
*G06F 19/00* (2011.01)
(52) U.S. Cl.
USPC .............................. 701/120; 701/14; 340/945
(58) Field of Classification Search
USPC .............................. 701/14, 120; 340/945, 990
See application file for complete search history.

(56) References Cited

U.S. PATENT DOCUMENTS

| | | | |
|---|---|---|---|
| 4,642,775 A | 2/1987 | Cline et al. |
| 4,825,374 A | 4/1989 | King et al. |
| 6,163,744 A | 12/2000 | Onken et al. |
| 6,278,965 B1 | 8/2001 | Glass et al. |
| 6,393,358 B1 | 5/2002 | Erzberger et al. |
| 6,584,400 B2 | 6/2003 | Beardsworth |
| 6,604,044 B1 | 8/2003 | Kirk |
| 6,606,553 B2 | 8/2003 | Zobell et al. |
| 6,816,780 B2 | 11/2004 | Naimer et al. |
| 6,873,903 B2 | 3/2005 | Baiada et al. |
| 7,024,287 B2 | 4/2006 | Peckham et al. |
| 7,248,963 B2 | 7/2007 | Baiada et al. |
| 7,269,486 B2 | 9/2007 | Artini |
| 7,271,740 B2 | 9/2007 | Fischer |
| 7,313,475 B2 | 12/2007 | Green |
| 7,366,591 B2 | 4/2008 | Hartmann et al. |
| 7,599,847 B2 | 10/2009 | Block et al. |

(Continued)

FOREIGN PATENT DOCUMENTS

| | | |
|---|---|---|
| EP | 1818891 | 8/2007 |
| EP | 1995706 A2 | 11/2008 |

(Continued)

OTHER PUBLICATIONS

Oprins et al., "Impact of Future Time-Based Operations on Situation Awareness of Air Traffic Controllers", Paper 16, Eighth USA/Europe Air Traffic Management Research and Development Seminar, Napa, CA, Jun. 2009, pp. 1-10.

(Continued)

*Primary Examiner* — Thomas Black
*Assistant Examiner* — Luke Huynh
(74) *Attorney, Agent, or Firm* — Yee & Associates, P.C.

(57) ABSTRACT

The different advantageous embodiments provide a method for generating an integrated aircraft clearance. Flight information, preference information, environmental information, and constraints are retrieved from a number of sources. The flight information includes at least one of flight plan information, flight scheduling information, flight status information, and environmental information. The flight information is processed against the preference information, the environmental information, and the constraints. A clearance solution is generated for an aircraft based on the flight information, the preference information, the environmental information and the constraints.

20 Claims, 8 Drawing Sheets

(56) References Cited

U.S. PATENT DOCUMENTS

| | | | |
|---|---|---|---|
| 7,606,641 | B2 | 10/2009 | Allen |
| 7,619,555 | B2 | 11/2009 | Rolfe |
| 7,669,270 | B2 | 3/2010 | Hutton |
| 7,702,427 | B1 * | 4/2010 | Sridhar et al. .................... 701/4 |
| 7,925,394 | B2 | 4/2011 | Deker et al. |
| 8,014,907 | B2 | 9/2011 | Coulmeau |
| 8,027,783 | B2 | 9/2011 | Closse et al. |
| 8,032,268 | B2 | 10/2011 | Burgin et al. |
| 8,090,531 | B2 | 1/2012 | Goutelard et al. |
| 2003/0050746 | A1 | 3/2003 | Baiada et al. |
| 2004/0078136 | A1 | 4/2004 | Cornell et al. |
| 2004/0193362 | A1 | 9/2004 | Baiada et al. |
| 2006/0022845 | A1 * | 2/2006 | Fischer ........................ 340/945 |
| 2007/0219679 | A1 | 9/2007 | Coulmeau |
| 2008/0098539 | A1 | 5/2008 | Hutton |
| 2008/0154448 | A1 | 6/2008 | Mead et al. |
| 2008/0177432 | A1 | 7/2008 | Deker et al. |
| 2008/0186222 | A1 | 8/2008 | Rolfe |
| 2009/0092074 | A1 | 4/2009 | Jamalipour et al. |
| 2010/0082185 | A1 | 4/2010 | Grattard et al. |
| 2010/0082186 | A1 | 4/2010 | Burgin et al. |
| 2010/0241345 | A1 | 9/2010 | Cornell et al. |
| 2010/0324812 | A1 | 12/2010 | Sacle et al. |
| 2010/0332111 | A1 | 12/2010 | Closse et al. |
| 2012/0083946 | A1 | 4/2012 | Maldonado et al. |

FOREIGN PATENT DOCUMENTS

| | | |
|---|---|---|
| WO | 2009082785 A1 | 7/2009 |
| WO | 2012044405 | 4/2012 |
| WO | 2012044406 | 4/2012 |

OTHER PUBLICATIONS

Coppenbarger et al., "Design and Development of the En Route Descent Advisor (EDA) for Conflict-Free Arrival Meeting", AIAA-2004-4875, AIAA Guidance, Navigation, and Control Conference, Providence, RI, Aug. 16-19 2004, pp. 1-19.

FAA Order 8260.40B, "Flight Management System (FMS) Instrument Procedures Development", U.S. Department of Transportation Federal Aviation Administration, Dec. 31, 1998, pp. 1-78.

PCT Search Report dated Nov. 25, 2011, regarding International Application No. PCT/US2011/047979 dated Aug. 16, 2011, issued by International Searching Authority.

Coppenbarger et al., "Field Evaluation of the Tailored Arrivals Concept for Datalink-Enabled Continuous Descent Approach", 7th AIAA ATIO Conference, Sep. 18, 2007, 14 pgs., AIAA, Belfast.

Korn et al., "4D Trajectory Management in the Extended TMA: Coupling AMAN and 4D FMS for Optimized Approach Trajectories", 25th International Congress of the Aeronautical Sciences, 10 pgs., Sep. 3-8, 2006, Hamburg.

PCT Search Report dated Dec. 5, 2011, regarding International Application No. PCT/US2011/047964 dated Aug. 16, 2011, issued by International Searching Authority.

Non-final office action dated Nov. 6, 2012 regarding U.S. Appl. No. 12/895,447, 35 pages.

U.S. Appl. No. 12/405,865, filed Sep. 30, 2010, Maldonado et al.

U.S. Appl. No. 12/405,865, filed Mar. 17, 2009, Cornell et al.

Final office action dated Sep. 7, 2012 regarding U.S. Appl. No. 12/405,865, 12 pages.

Li et al., "Identity-based Secure Communications with Aircraft", U.S. Appl. No. 12/904,339, filed Oct. 14, 2010, 38 pages.

PCT Search Report and Written Opinion dated Jul. 26, 2010 regarding international application No. PCT/US2010/024722, applicant's reference 08-1127PCT, applicant The Boeing Company, 19 pages.

Baek et al., "A Survey of Identity-Based Cryptography", Proceedings of Australian Unix Users Group Annual Conference, 2004, 10 pages.

Robinson et al., "Impact of Public Key Enabled Applications on the Operation and Maintenance of Commercial Airplanes", AIAA Aviation Technology Integration and Operations (ATIO) Conference, Sep. 2007, 10 pages.

Weitz, "An analysis of merging and spacing operations with continuous descent approaches", 24th Digital Avionics Systems Conference, vol. 1, Oct./Nov. 2005 (Abstract).

USPTO Office Action dated Jun. 22, 2012 for U.S. Appl. No. 12/904,339, 17 pages.

USPTO Office Action dated Nov. 28, 2011 for U.S. Appl. No. 12/405,865, 12 pages.

Non-final office action dated Aug. 1, 2013 regarding U.S. Appl. No. 12/904,339, 20 pages.

Final office action dated Jul. 3, 2013 regarding U.S. Appl. No. 12/895,447, 31 pages.

Final Office Action, dated Mar. 13, 2013, regarding U.S. Appl. No. 12/904,339, 34 pages.

* cited by examiner

TAILORED ARRIVALS ALLOCATION SYSTEM CLEARANCE GENERATOR

CROSS REFERENCE TO RELATED APPLICATIONS

This application is related to commonly assigned and co-pending U.S. patent application Ser. No. 12/895,447 entitled "Tailored Arrivals Allocation System Trajectory Predictor" which is hereby incorporated by reference.

BACKGROUND INFORMATION

1. Field:

The present disclosure relates generally to a data processing system and more particularly to a system for tailored arrivals allocation. Still more particularly, the present disclosure relates to a clearance generator for tailored arrivals allocation.

2. Background:

Flight management involves several variables, including aircraft intent and airspace resources. The aircraft intent may be realized from the flight plan of a particular aircraft. The airspace resources available to a particular flight may vary according to runway configurations, airway availability, airspace volumes, and other constraints. Reconciling the intent of an aircraft using airspace resources with the managers of airspace resources as well as other airspace users is part of flight management.

Aircraft intent information is received from disparate sources, and the distributed nature of the information results in different formats and semantics by which the information is expressed. This intent information also becomes available at different stages of a flight's progression and to different actors. The combination of these intents with potentially conflicting needs of air traffic management needs to be provided in a timely fashion so as to allow for maximum use of airspace resources.

Therefore, it would be advantageous to have a method and apparatus that addresses one or more of the issues discussed above.

SUMMARY

The different advantageous embodiments provide a method for generating an integrated aircraft clearance. Flight information, preference information, environmental information, and constraints are retrieved from a number of sources. The flight information includes at least one of flight plan information, flight scheduling information, flight status information, and environmental information. The flight information is processed against the preference information, the environmental information, and the constraints. A clearance solution is generated for an aircraft based on the flight information, the preference information, the environmental information and the constraints.

The different advantageous embodiments further provide a system for generating an integrated aircraft clearance comprising a flight object manager and a clearance generator. The flight object manager is configured to collect flight information and preference information. The flight information includes at least one of a number of flight plans, a number of flight schedules, and flight status information. The preference information includes at least one of airline preference and aircraft preference. The clearance generator is in communication with the flight object manager and is configured to receive the flight information and the preference information along with environmental information, identify a number of constraints and a number of preferences associated with a flight, and generate a number of solutions.

The different advantageous embodiments further provide an apparatus for generating an integrated aircraft clearance comprising a metering manager. The metering manager is configured to perform metering optimization by calculating a dynamic metering window for a number of flights using preferences and constraints identified by the apparatus. The apparatus receives the preferences along with flight information from a flight object manager. The apparatus identifies the constraints using the flight information received.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
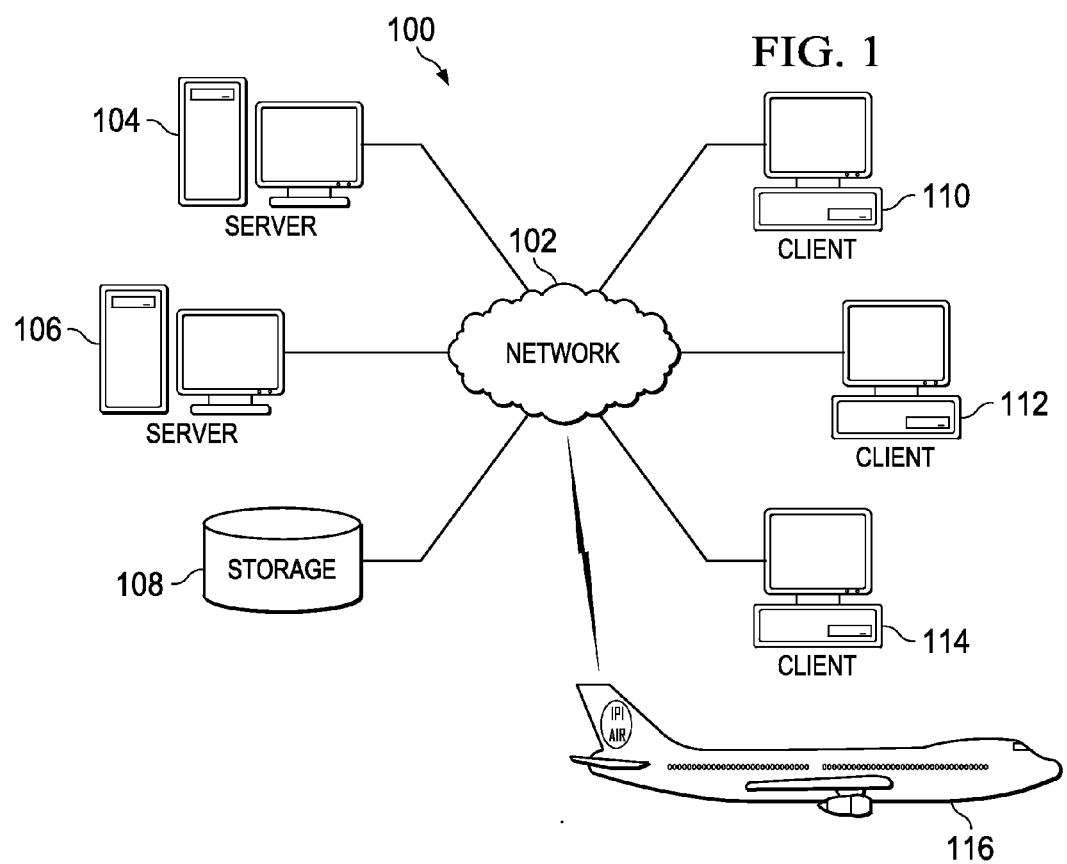
FIG. 1 is a pictorial representation of a network of data processing systems in which the advantageous embodiments of the present invention may be implemented.
Figure 2:
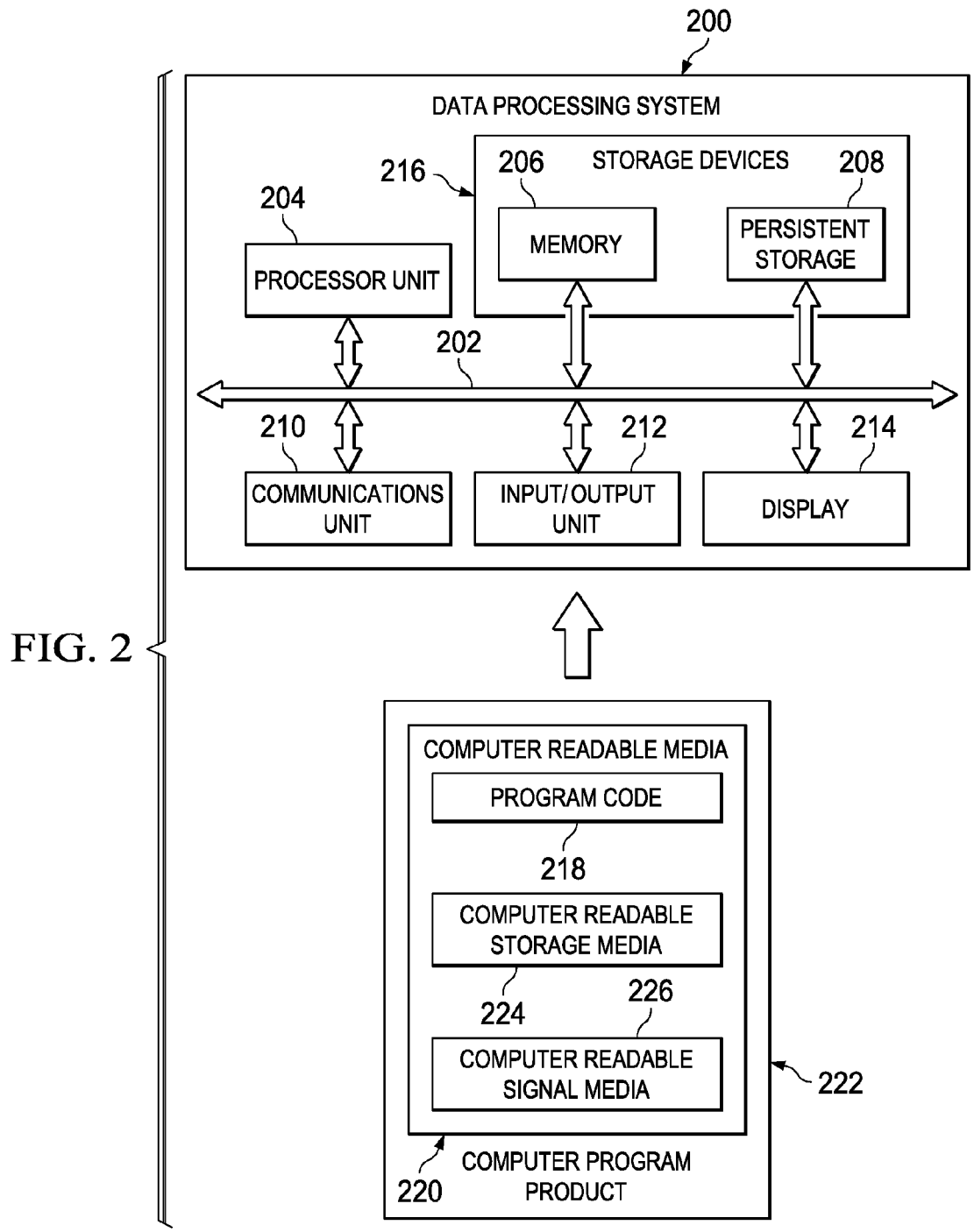
FIG. 2 is an illustration of a data processing system in accordance with an advantageous embodiment.

With reference now to the figures and in particular with reference to FIGS. 1-2, illustrative diagrams of data processing environments are provided in which the advantageous embodiments of the present invention may be implemented. It should be appreciated that FIGS. 1-2 are only illustrative and are not intended to assert or imply any limitation with regard to the environments in which different embodiments may be implemented. Many modifications to the depicted environments may be made.

With reference now to the figures, FIG. 1 depicts a pictorial representation of a network of data processing systems in which the advantageous embodiments of the present invention may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Aircraft 116 also is a client that may exchange information with clients 110, 112, and 114. Aircraft 116 also may exchange information with servers 104 and 106. Aircraft 116 may exchange data with different computers through a wireless communications link while in-flight and/or any other type of communications link while on the ground. In these examples, server 104, server 106, client 110, client 112, and client 114 may be computers. Network data processing system 100 may include additional servers, clients, and other devices not shown.

In the depicted example, network data processing system 100 is the Internet with network 102 representing a worldwide collection of networks and gateways that may use the Transmission Control Protocol/Internet Protocol (TCP/IP) suite of protocols or other functionally similar communication protocols to communicate with one another. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

Turning now to FIG. 2, an illustration of a data processing system is depicted in accordance with an advantageous embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

The different advantageous embodiments recognize and take into account that current systems do not integrate the intentions and needs of actors in an airspace, such as the aircraft, the aircraft operator, and the air navigation service providers, to produce a single clearance. These current methods solve portions of the problem without addressing all aspects or integrating the intentions and needs of all actors. For example, current systems may assist controllers with metering arrival of aircraft in order to satisfy air traffic control constraints, but do not take into account the preferences of an airline or aircraft. Other systems may give advice for speed and routing, but fail to take into account all possible constraints and preferences outside of speed and routing.

Thus, different advantageous embodiments provide a method for generating an integrated aircraft clearance. Flight information, preference information, environmental information, and constraints are retrieved from a number of sources. The flight information includes at least one of flight plan information, flight scheduling information, flight status information, and environmental information. The flight information is processed against the preference information, the environmental information, and the constraints. A clearance solution is generated for an aircraft based on the flight information, the preference information, the environmental information and the constraints.

The different advantageous embodiments further provide a system for generating an integrated aircraft clearance comprising a flight object manager and a clearance generator. The flight object manager is configured to collect flight information and preference information. The flight information includes at least one of a number of flight plans, a number of flight schedules, and flight status information. The preference information includes at least one of airline preference and aircraft preference. The clearance generator is in communication with the flight object manager and is configured to receive the flight information and the preference information along with environmental information, identify a number of constraints and a number of preferences associated with a flight, and generate a number of solutions.

The different advantageous embodiments further provide an apparatus for generating an integrated aircraft clearance comprising a metering manager. The metering manager is configured to perform metering optimization by calculating a dynamic metering window for a number of flights using preferences and constraints identified by the apparatus. The apparatus receives the preferences along with flight information from a flight object manager. The apparatus identifies the constraints using the flight information received.

Figure 3:
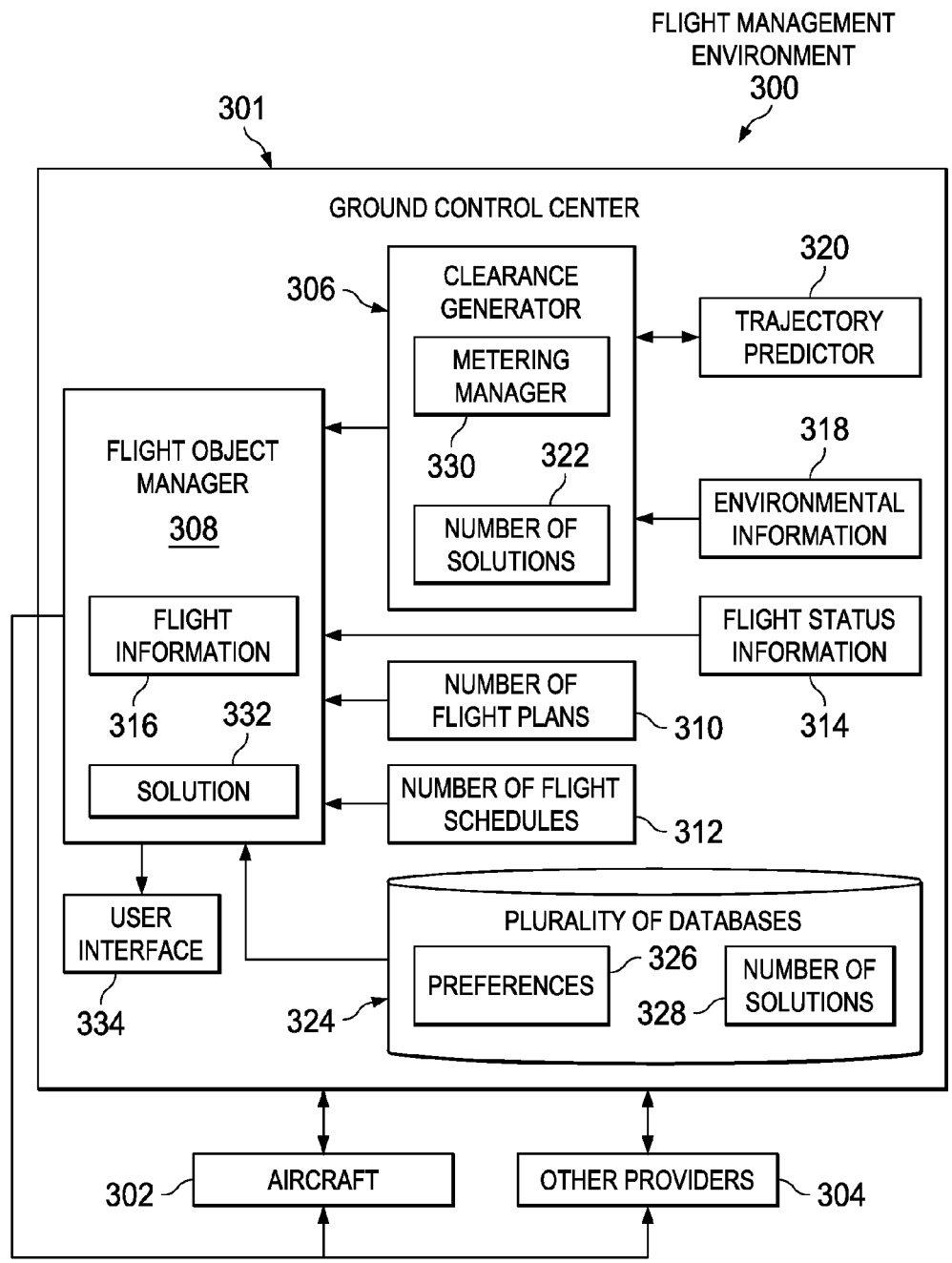
FIG. 3 is an illustration of a flight management environment in accordance with an advantageous embodiment.

Turning now to FIG. 3, an illustration of a flight management environment is depicted in accordance with an advantageous embodiment. Flight management environment 300 is an illustrative example of an environment that may be implemented in network data processing system 100 in FIG. 1.

Flight management environment 300 includes ground control center 301, aircraft 302, and other providers 304. Ground control center 301 may be an airspace resource manager, such as an aircraft operations center or air traffic control, for example. Ground control center 301 communicates with aircraft 302 and other providers 304 using a network, such as network 102 in FIG. 1. Other providers 304 may include, for example, without limitation, air navigation service providers, weather information providers, and/or any other suitable provider of information related to flight management.

Ground control center 301 includes clearance generator 306. In one advantageous embodiment, clearance generator 306 may be part of a tailored arrivals allocation system implemented at ground control center 301, for example. Clearance generator 306 provides an efficient trajectory arrival management solution by combining aircraft operator and aircrew preferences with air traffic situation information and weather information. Clearance generator 306 uses knowledge of airborne automation, aircraft performance, and airspace limitations to generate solutions. A solution may be an integrated aircraft clearance that meets the needs and intent of the aircraft within the constraints applicable for the airspace, for example. Clearance generator 306 processes the availability of the required airspace resources, up to and including the landing runway, against airline and aircraft preferences to produce a corresponding clearance for each individual aircraft, adding constraints and/or asserting modifications to the extent needed to satisfy resources constraints and facilitate operator preferences with minimal impairment.

Flight object manager 308 retrieves information from number of flight plans 310, number of flight schedules 312, and flight status information 314, and consolidates the information retrieved to form flight information 316.

Clearance generator 306 uses flight information 316 from flight object manager 308, along with environmental information 318, and trajectory predictor 320 to generate number of solutions 322. Number of flight plans 310 represents the intent of a number of aircraft corresponding to flights for the number of aircraft. For example, an aircraft may undertake a number of flights, and each flight may correspond to a specific flight plan. The flight plan represents the intent of the aircraft for that specific flight.

Number of flight schedules 312 is scheduling information that corresponds to each flight. Number of flight schedules 312 may be controlled by an external scheduler, or resource manager, in an illustrative example. Number of flight schedules 312 provides arrival schedules for flights using controlled times of arrival. In one illustrative example, an air navigation service provider may provide controlled times of arrival for a number of flights, presenting time windows in which each flight must arrive in order to perform metering of traffic, which allows avoidance of airspace and/or runway conflicts. Metering is a traffic management scheme that allows aircraft to be properly aligned in space before landing. The scheduler providing number of flight schedules 312 may provide the metering times and controlled times of arrival for each flight, for example.

Flight status information 314 is dynamic, up-to-date information about the current status of individual flights. Flight status information 314 may include the position, location, altitude, and time associated with the position, location, and altitude, for a specific flight. The information in flight status information 314 may be provided directly by aircraft 302 and/or through an aircraft operations system receiving surveillance updates from aircraft 302, for example. Flight status information 314 may trigger clearance generator 306 to begin processing information to generate a clearance solution, in some advantageous embodiments. In other advantageous embodiments, clearance generator 306 may receive a request for a clearance solution from aircraft 302, an aircraft operations center, and/or air traffic control, for example.

Environmental information 318 may include weather information, non-flight data, and non-surveillance data, wind speed and direction, and/or any other suitable environmental information. Non-flight data may include, for example, without limitation airspace definition and airway availability. Non-surveillance data may include, for example, without limitation, runway availability information. Trajectory predictor 320 calculates a trajectory for a flight based on aircraft performance data and constraints related to the flight plan for a specific flight provided by clearance generator 306. Constraints may be, for example, without limitation, speed and altitude constraints.

Clearance generator 306 has access to plurality of databases 324. Plurality of databases 324 may be located remote from clearance generator 306 in one advantageous embodiment. Plurality of databases 324 may include preferences 326, number of solutions 328, flight plan databases, and/or any other suitable database. Preferences 326 contains preference information used by clearance generator 306 to generate integrated aircraft clearances, or solutions. Preference information may include airline operator preferences, aircrew preferences, and aircraft preferences. These preferences may include preferences for preferred routing, speed schedules, arrival time, fuel efficiency, and the like. For example, the preferences may include, without limitation, a preference for fuel efficiency rather than a specific arrival time, a preference for a specific arrival time rather than fuel efficiency, a preference for a specific route, and/or any other preference that factors into a clearance solution. Number of solutions 328 may include previous clearance solutions generated by clearance generator 306 for a specific flight or flight plan, such as number of solutions 322 for example.

Clearance generator 306 also includes metering manager 330. Metering manager 330 performs metering optimization by calculating a dynamic metering window for a number of flights using preferences and constraints identified by clearance generator 306, such as preferences 326 from plurality of databases 324 and flight information 316 from flight object manager 308. Metering manager 330 ensures that the time margin, or metering window, that may be applied to a controlled time of arrival constraint placed on a specific flight will not conflict with another flight within the airspace. This metering window will be established in accordance with rules provided by the air navigation service provider responsible for the airspace in question for the flight, for example. A metering window may have a range of time during which the controlled time of arrival is acceptable for a given flight, for example. Clearance generator 306 can exploit that metering window for the benefit of the airline or aircraft preferences being pursued for a specific flight, in this example.

Clearance generator uses flight information 316 from flight object manager 308, along with environmental information 318, and trajectory predictor 320 to generate number of solutions 328. Number of solutions 328 is clearance solutions for a given flight, which is then sent to flight object manager 308. Solution 332 is an illustrative example of a clearance solution generated by clearance generator 306 and transmitted to flight object manager 308. Flight object manager 308 may then distribute solution 332 to the appropriate component within flight management environment 300 for message construction to interested parties, such as aircraft 302, other providers 304 and/or user interface 334. User interface 334 may be a user interface of the aircraft operations center, and/or air traffic control, for example.

The illustration of flight management environment 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 4:
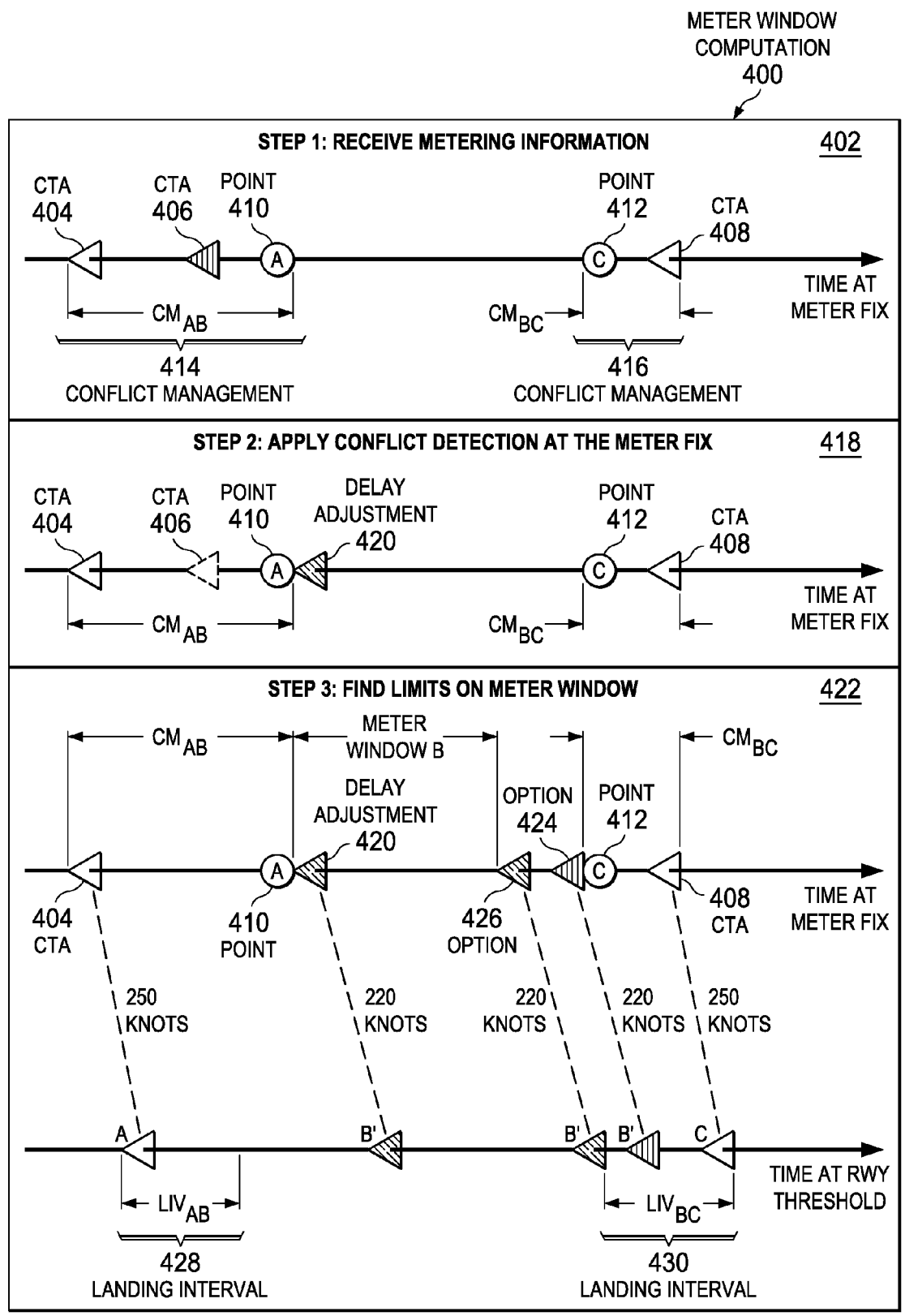
FIG. 4 is an illustration of a meter window computation in accordance with an advantageous embodiment.

Turning now to FIG. 4, an illustration of a meter window computation is depicted in accordance with an advantageous embodiment. Conflict detection during meter window computation 400 is an example of one implementation of a metering determination generated by metering manager 330 in FIG. 3.

Meter window computation 400 depicts a number of steps metering manager 330 in FIG. 3 may take to determine a conflict free meter window for an aircraft executing a flight. The first step is to receive metering information 402. The metering information may be received from information provided by a scheduler, such as number of flight schedules 312 in FIG. 3. The flight scheduling information may include information for a number of flights. In this illustrative example, controlled time of arrival (CTA) 404 represents the controlled time of arrival for a first aircraft, CTA 406 represents the controlled time of arrival for a second aircraft, and CTA 408 represents the controlled time of arrival for a third aircraft at the metering fix calculated by the scheduler.

Point 410 and point 412 represent the spacing in time before and/or after each aircraft required for conflict avoidance at the meter fix. In this example, metering manager 330 in FIG. 3 determines the spacing required to avoid conflict between the first aircraft and the second aircraft, depicted by conflict management 414, and the spacing required to avoid conflict between the second aircraft and the third aircraft, depicted by conflict management 416.

The second step is to apply conflict detection at the meter fix 418. The metering manager applies the conflict detection and determines that delay adjustment 420 for the second aircraft is required for de-confliction at the meter fix. De-confliction refers to conflict detection, as used herein. Consequently, the earliest time the second aircraft can arrive at the meter fix is adjusted, as represented by delay adjustment 420.

The third step is find limits on meter window 422. The clearance generator, using the metering manager, determines the metering window for the second aircraft by finding the earliest time available after the first aircraft and the latest time available before the trailing aircraft, or the third aircraft in this example. To find the latest time before the third aircraft, the clearance generator determines the space required for conflict avoidance with the third aircraft at the metering fix. In some situations, this may be the edge of the metering window, as represented by option 424 against point 412. In other situations, such as where the third aircraft flies at a faster speed than the second aircraft after they each pass the meter fix, a conflict may emerge at the runway. In the latter situation, the clearance generator further considers the spacing required at the arrival runway, represented by landing interval 428 and landing interval 430.

In an illustrative example, if the third aircraft flies 250 knots after the metering fix and the second aircraft is assigned a controlled time of arrival at the edge of point 412 and flies a speed of 220 knots in the airspace, the second aircraft may arrive late enough at the runway to conflict with landing interval 430. In order to avoid this conflict, the clearance generator considers the time spent by the trailing aircraft in the sequence in the airspace to determine if the landing interval is honored. In this example, the landing interval 430 creates a greater constraint on the meter window than conflict management 414 at the meter fix only, and the latest controlled time of arrival that the second aircraft could be given is option 426. Only conflict detection at the metering fix is described herein, while conflict detection is applied to the entire arrival solution later in the process.

The external scheduler may be unaware of the conflict it is creating when it assigns times over the metering fix. Clearance generator 306 of FIG. 3 supplements the scheduler logic to determine controlled times of arrival within the appropriate constraints.

The illustration of conflict detection at the meter fix in meter window computation 400 in FIG. 4 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 5A:
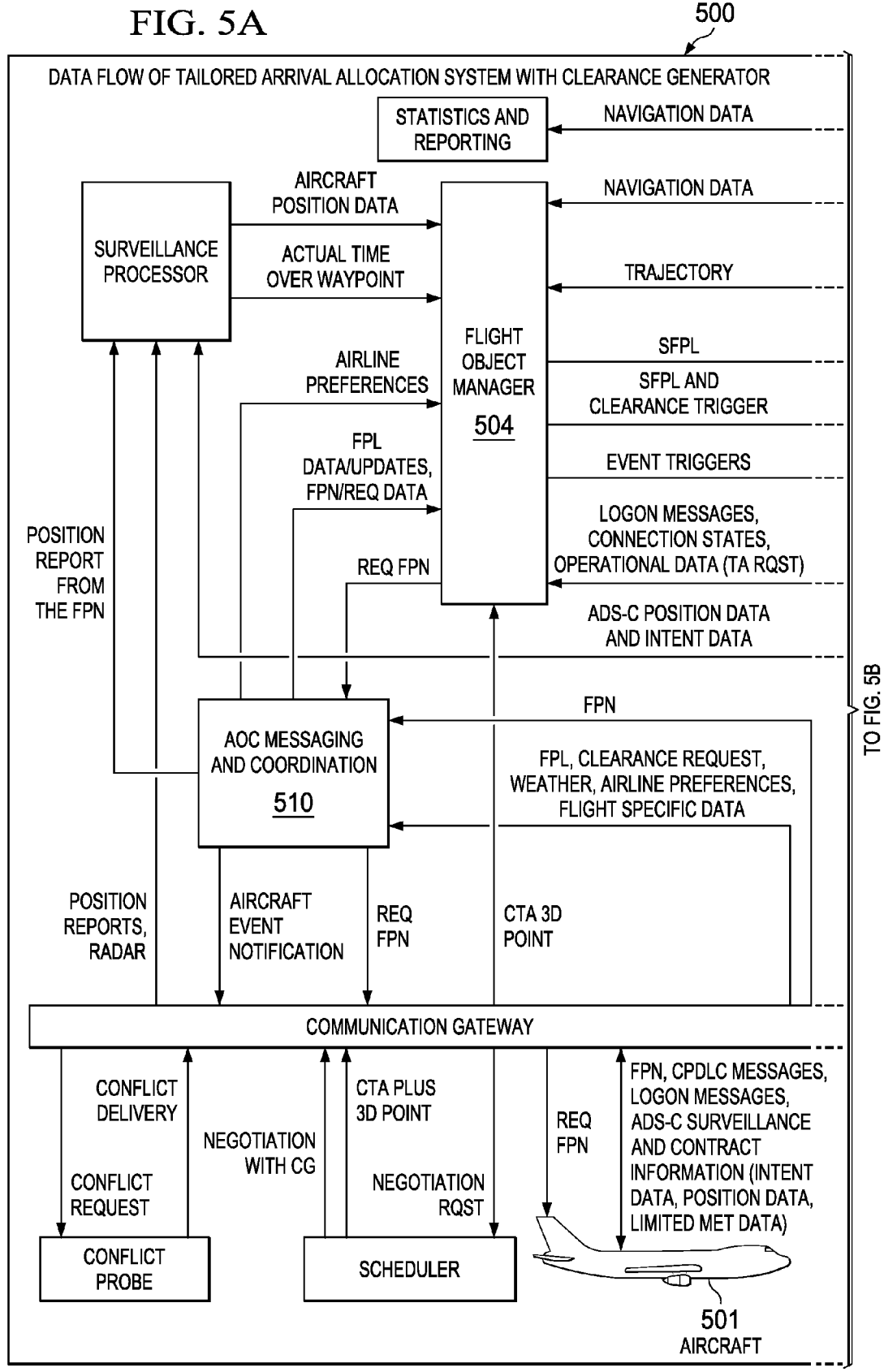
FIGS. 5A and 5B are an illustration of a data flow of tailored arrival allocation system with clearance generator in accordance with an advantageous embodiment.
Figure 5B:
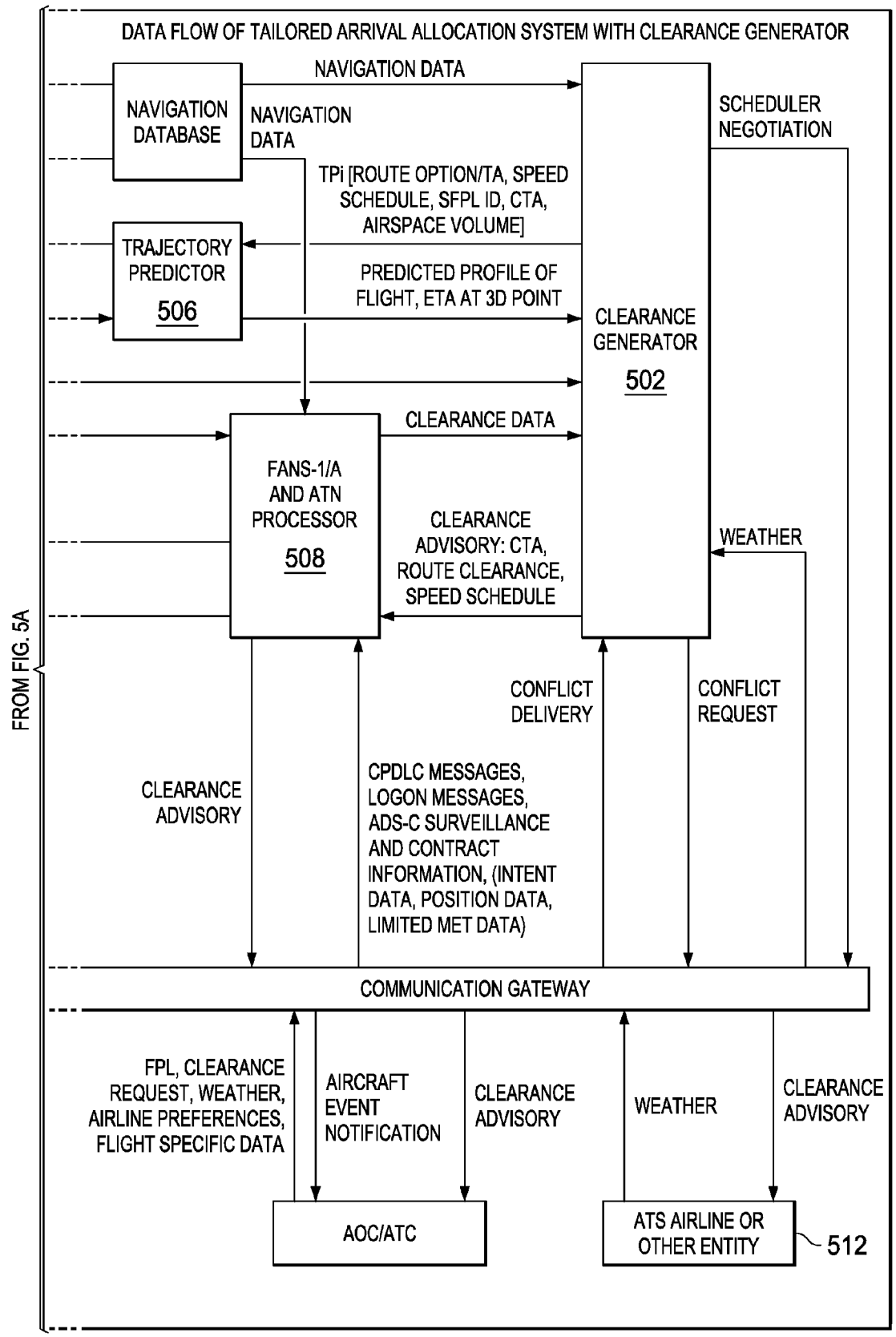

Turning now to FIGS. 5A and 5B, an illustration of a data flow of tailored arrival allocation system with clearance generator is depicted in accordance with an advantageous embodiment. The data flow in FIGS. 5A and 5B is an illustrative example of one implementation of a clearance generator, such as clearance generator 306 in FIG. 3, within a tailored arrival allocation system.

Clearance generator 502 may be configured to generate solutions for aircraft 501, in this illustrative example. Clearance generator 502 receives flight specific inputs from flight object manager 504 and trajectories from trajectory predictor 506. Once clearance generator 502 is activated to pursue a solution for a flight, it communicates directly with trajectory predictor 506 to find the correct speed and route or required time of arrival (RTA). When the solution is complete, clearance generator 502 transmits the solution, or advice, to the appropriate messaging function. The messaging function selected may be, for example, FANS-1/A and ATN processor 508, Airline Operation Center (AOC) messaging and coordination function 510, or Air Traffic Services (ATS) 512, for example.

The illustration of the data flow in FIGS. 5A and 5B is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 6A:
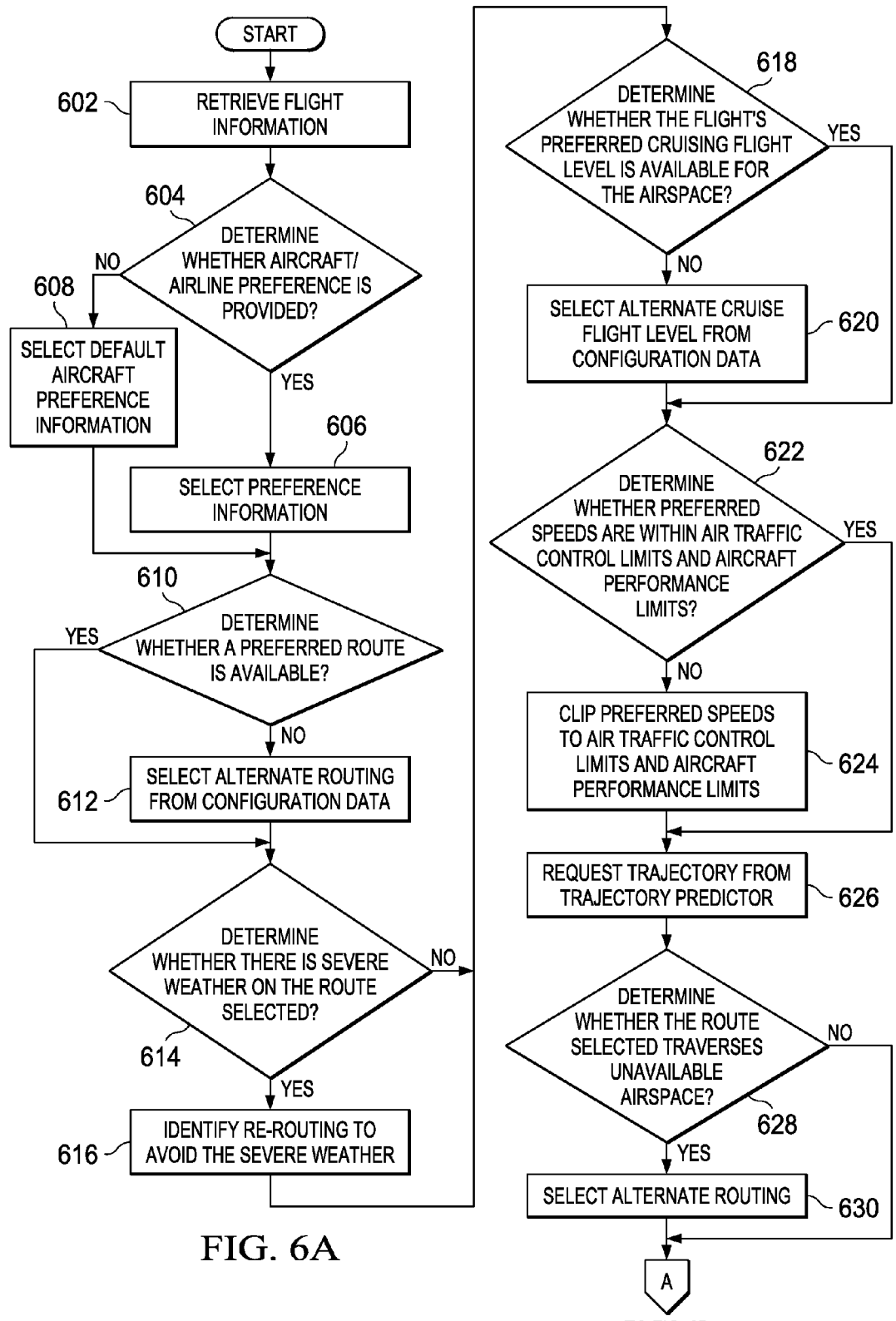
FIGS. 6A and 6B are an illustration of a flowchart of a process for a clearance generator in accordance with an advantageous embodiment.
Figure 6B:
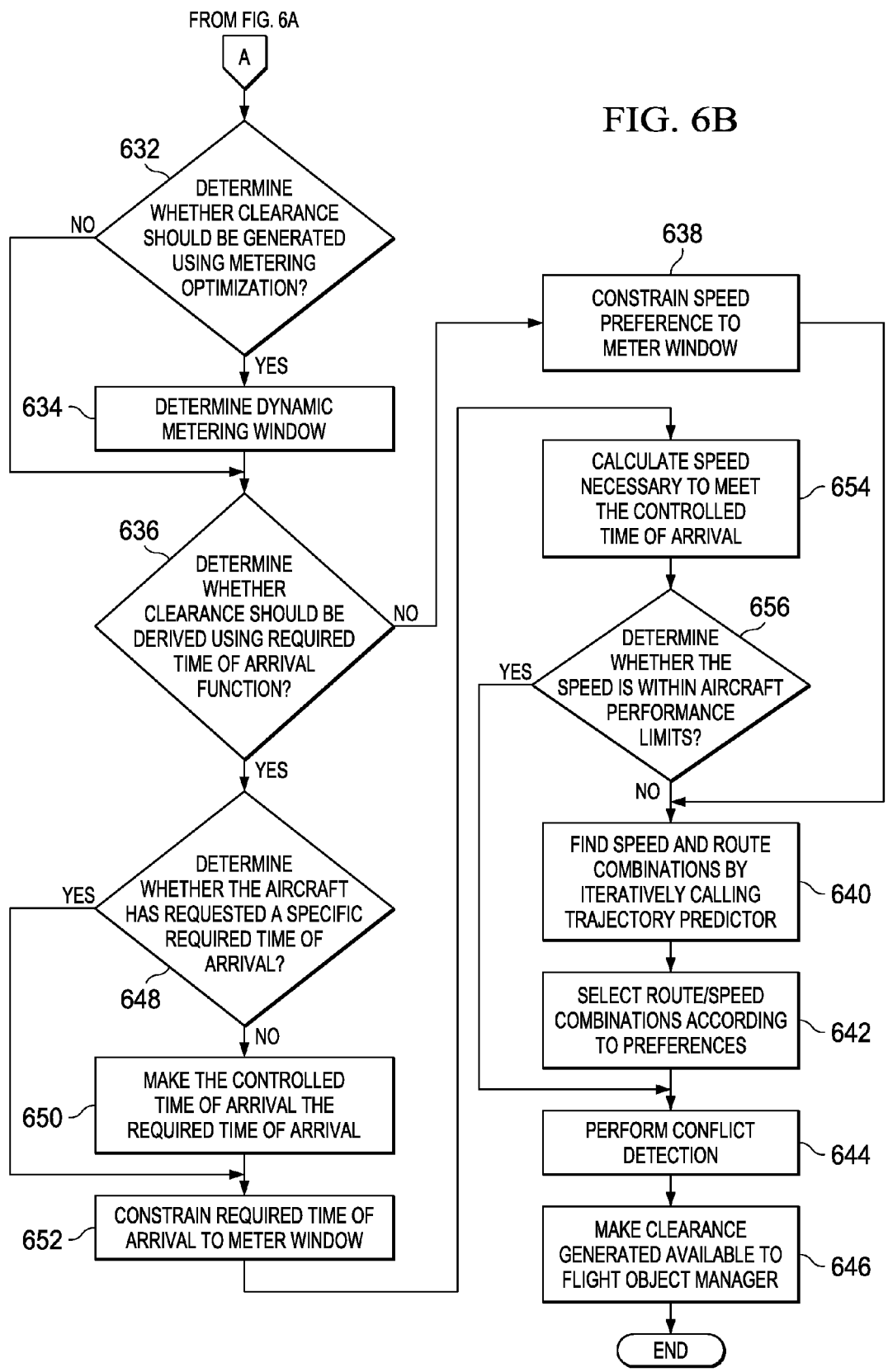

Turning now to FIGS. 6A and 6B, an illustration of a flowchart of a process for a clearance generator is depicted in accordance with an advantageous embodiment. The process in FIGS. 6A and 6B may be implemented by a component such as clearance generator 306 in FIG. 3.

The process begins by retrieving flight information (operation 602) from the flight object manager. The process may be initially triggered by an event, such as an aircraft entering the initial contact ring or receiving a specific clearance request. The initial contact ring is the horizon for which the ground system becomes interested in control of the aircraft's arrival. The specific clearance request may be received from an aircraft, an aircraft operation center, and/or an air traffic control center, for example. The process collects all flight plan information available to the system.

The process determines whether aircraft or airline preferences are provided (operation 604). The preference information may be included in a clearance request received, stored in a database, such as plurality of databases 324 in FIG. 3, or through direct delivery from the aircraft or aircraft operator. The preferences may be preferences for speed, arrival time, and/or route. For example, an aircraft may give a single preference for speed and no preferences for route. In this illustrative example, the clearance generator would use the aircraft preference for speed but use the airline preference for route. In this way, the clearance generator is capable of blending the preferences of individual aircraft and airlines when building a solution.

If a determination is made that the aircraft or airline preferences exist, the process selects the preference information (operation 606). If a determination is made that no aircraft preferences exists, the process selects default aircraft preference information (operation 608). If no preference information item is available for and/or received from an aircraft, the default preference information item from the airline will be used, if given. This information may be submitted dynamically by means of a tailored arrival allocation system working position or a sub-system of the airline operations center, or by way of a pre-defined off-line preference submitted by the airline for use by the system.

The process then determines whether a preferred route is available (operation 610). The preferred route may be identified from the preference information. The clearance generator will consider criteria such as, without limitation, arrival system entry point, airway availability, meter-fix, approach procedure, and landing runway to determine if a preferred route is available. The clearance generator may also take into account whether certain routes are dynamically marked as unavailable by the responsible air navigation service provider.

If a determination is made that the preferred route is unavailable, the process selects alternate routing from configuration data (operation 612) and proceeds to operation 614. The alternate routing may be the most direct alternate route from configuration data, for example. Configuration data may be predefined tables providing alternative routing information, for example. Configuration data may be stored in a data store in memory and/or in a database accessible to a clearance generator. Configuration data may be viewed by the clearance generator as a catalog of routes available for a flight to use, for example. The clearance generator may select a published approach or arrival for altitudes below the minimum vectoring altitude in a given airspace, for example. As such, the dynamic portion of the route designed by the clearance generator will be above the approach and/or arrival and contained within controlled airspace.

The process proceeds to determine whether there is severe weather on the route selected (operation 614). The route selected may be the preferred route, if determined to be available in operation 610. The route selected may be an alternate route if the preferred route is unavailable, for example. Notice of severe weather on given routes may be received from an outside component that compares the trajectory for flights with a multi-dimensional weather source. The trajectory for the flight may be accessed and/or retrieved from a trajectory predictor, such as trajectory predictor 320 in FIG. 3, in one illustrative example. This notice of severe weather may be received by the clearance generator through environmental information, such as environmental information 318 in FIG. 3, for example.

The multi-dimensional weather source may provide three-dimensional weather information, four-dimensional weather information, and/or any number of dimensions of weather information. Three-dimensional weather information may be weather information for a location, position, and altitude, for example. Four-dimensional weather information may be weather information for a location, position, altitude, and time, for example.

If a determination is made that there is severe weather on the route selected, the process identifies re-routing to avoid the severe weather (operation 616), and proceeds to operation 618. Weather systems present along a trajectory or route may cause an aircraft to prefer circumventing the weather systems. If such avoidance preferences are made available through interfaces with the airline operations center, the clearance generator will integrate those preferences into the clearance solution, possibly by selecting an alternate route, for example.

The process determines whether the flight's preferred cruising flight level is available for the airspace (operation 618). Availability of cruising levels in a given airspace may be dependent upon the time of day, for example. The preferred cruising level will be checked against the flight levels marked as available in configuration data for the en-route segments being flown.

If a determination is made that the preferred cruising level is not available, the process selects an alternate cruise flight level from configuration data (operation 620), and proceeds to operation 622. The process determines whether preferred speeds are within air traffic control limits and aircraft performance limits (operation 622). The clearance generator considers both the preferred speeds from the airline and from the specific flight and aircraft in question to determine if they are within the air traffic control limits and the aircraft performance limits. If a determination is made that the preferred speeds are not within the air traffic control limits and/or the aircraft performance limits, the process clips the preferred speeds to the air traffic control limits and the aircraft performance limits (operation 624). In an illustrative example, if clipping the preferred speed to meet air traffic control limits would result in a speed that is outside the aircraft's performance limits, speeds may not be clipped. The selected speeds may be modified by subsequent steps in the clearance generator process if this is required for arrival metering purposes, for example.

The process then requests a trajectory from a trajectory predictor (operation 626). The trajectory predictor will calculate the trajectory based on aircraft performance data, taking into account all constraints that are related to the trajectory being flown, such as speed and altitude constraints, for example.

The process determines whether the route selected traverses unavailable airspace (operation 628). Airspaces dynamically switch from accessible to inaccessible throughout the day depending upon agreements with the military, changes to departure and/or arrival schemes, and other reasons. If a determination is made that the route selected crosses into unavailable airspace, the process selects alternate routing (operation 630), and proceeds to operation 632.

At this stage in the clearance generation process, an aircraft trajectory has been established that will comply with airspace limitations and, to the extent possible, aircraft preferences. However, an additional constraint that the trajectory will be checked against is the arrival metering, which determines the sequence and amount of traffic that can be accommodated by the arrival resources, such as the landing runway or terminal air traffic control airspace, for example. The arrival metering may indicate a required time at which the aircraft needs to arrive over a meter fix, the controlled time of arrival (CTA). This fix may be located at the initial approach fix (IAF) or the landing runway itself, for example.

If a determination is made that the route selected does not cross unavailable airspace, the process determines whether clearance should be generated using metering optimization (operation 632). If there is a controlled time of arrival for the flight, and a determination is made that metering optimization should be used, the process determines a dynamic metering window (operation 634). The clearance generator determines the time margin, or metering window, that may be applied to the controlled time of arrival constraint. This metering window may be established in accordance with the rules agreed with the air navigation service provider responsible for the air traffic control airspace in question, in one illustrative example.

The clearance generator exploits the metering window for the benefit of the airline and/or aircraft, using the preferences being pursued. The use of dynamic metering windows may be limited to preferred airlines, in some advantageous embodiments. If agreed with the applicable air navigation service provider, the clearance generator will dynamically establish the metering window by determining the amount of plan-time available before and/or after the allocated controlled time or arrival, such as in FIG. 4, for example.

If a determination is made that metering optimization should not be used the process proceeds directly to operation 636, and works with a fixed metering window. A fixed metering window may be set at a predetermined time, such as thirty seconds, in one illustrative example.

The process determines whether clearance should be derived using the required time of arrival function (operation 636). The use of the required time of arrival (RTA) function may be subject to one or more conditions. These conditions may include, without limitation, aircraft capability, airline authorization and preference, meter-fix constraints, traffic density, and/or any other suitable condition. Aircraft capability entails that the aircraft is listed as equipped with the RTA function, and the RTA function will operate in its intended capacity, such as in descent if necessary. Certain airlines may limit the use of the RTA function, in some illustrative examples. Meter-fix constraints may apply if application of the RTA function is limited to specific meter-fixes. Traffic density refers to situations where the use of the RTA function is limited to low traffic conditions, for example.

The RTA function may be undesirable for air traffic control in some circumstances, due to lack of speed-uniformity and/or predictability, for example. The end result of an undesirable RTA function is controller intervention in the descent, leading to loss of the targeted efficiency and predictability benefits. This may become an issue for air traffic control in situations of high traffic densities, for example. If a flight is arriving under high-density traffic conditions, the availability of the RTA function may be suspended, or determined to be counter-productive for one or more flights. A high-density traffic condition is measured by the amount of flights that are predicted to arrive over a meter-fix within a parameter amount of time. If this number of flights exceeds a parameter value, the flight is considered to arrive under high-density conditions and the use of the RTA function may not be considered for the flight in question.

If a determination is made that the clearance should not be derived using the RTA function, the process constrains the speed preference to the meter window (operation 638). The process then finds speed and route combinations by iteratively calling the trajectory predictor (operation 640). The speed and route options may be applied to the trajectory while still maintaining the Estimated Time Over-meter-fix within the metering window. Several combinations of speed and route options may form part of the solution set for a given controlled time of arrival, in an illustrative example.

The process then selects a speed and route combination according to the preferences (operation 642). The clearance generator selects the combination that most closely matches the airlines and/or aircraft's preferences. When there is airline and/or aircraft preference information with respect to the arrival timing, the clearance generator logic will provide the capability to select the earliest available landing time in the metering window, the speed and route combination which produces the slowest speed, and/or the target speed requested by airline or aircraft.

The process then performs conflict detection (operation 644). The conflict detection is four-dimensional. To prevent clearances which cannot be executed due to air traffic control intervention, the clearance generator will determine when clearances conflict with one another to notify the operator. Conflicts are detected by comparing the four dimensional trajectories from the trajectory predictor. As such, conflict detection is applied to the entire arrival solution, both lateral and vertical path plus time. Conflict resolution is then left to the controller.

If a determination is made in operation 636 that clearance should be derived using the RTA function, the process then determines whether the aircraft has requested a specific required time of arrival (operation 648). If a determination is made that a specific RTA has not been requested, the process will make the controlled time of arrival the required time of arrival (operation 650), and proceed to operation 652.

If a determination is made that a specific RTA has been requested, the process constrains the required time of arrival to the meter window (operation 652). The clearance generator constrains the RTA to the meter window by clipping the time, if necessary. The clearance generator will either choose the preferred RTA-time submitted by the airline and/or aircraft or the earliest and/or latest times of the metering window which the aircraft can achieve based on the speed preferences.

The process calculates the speed necessary to meet the controlled time of arrival (operation 654). The process then determines whether the speed is within the aircraft performance limits (operation 656). If a determination is made that the speed is outside the performance limits of the aircraft, the process proceeds to operation 640, and finds a speed and route combination. If a determination is made that the speed is within the performance limits of the aircraft, the process proceeds to operation 644 and performs conflict detection.

The process then makes the clearance generated available to a flight object manager (operation 646), with the process terminating thereafter. The flight object manager, such as flight object manager 308 in FIG. 3, will distribute the raw clearance message to the appropriate component for message construction and distribution. The clearance may be distributed to an aircraft and/or ground services, for example.

Clearance delivery may happen repeatedly throughout the process. The initial clearance, containing only the route, may be delivered to the flight object manager, such as flight object manager 308 in FIG. 3. Upon receiving the controlled time of arrival information through the flight object manager from the scheduler, the clearance generator determines the metering advice, either required time of arrival or route/speed, and sends an updated clearance to the flight object manager. An updated clearance may be sent continually as the clearance generator monitors the flight progress and notices that the flight will not meet the controlled time of arrival, for example.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk—read only memory (CD-ROM), compact disk—read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The different advantageous embodiments recognize and take into account that current systems do not integrate the intentions of actors in an airspace, such as the aircraft, the aircraft operator, and the air navigation service providers, to produce a single clearance. These current methods solve portions of the problem without addressing all aspects or integrating the intentions of all actors. For example, current systems may assist controllers with metering arrival of aircraft in order to satisfy air traffic control constraints, but do not take into account the preferences of an airline or aircraft. Other systems may give advice for speed and routing, but fail to take into account all possible constraints and preferences outside of speed and routing.

Thus, the different advantageous embodiments provide a system and method that combines aircraft operator and aircrew preferences with air traffic situation information and weather information using detailed knowledge of airborne automation, aircraft performance, and airspace limitations, in order to provide an efficient trajectory arrival management solution. This system balances preferences against constraints to offer tailored clearance solutions for each flight that modify or constrain preferences only to the extent necessary to satisfy resource constraints, facilitating an operator's preferences with minimal impairment. The clearance solutions generated enhance the efficiency of flight routing and increase predictability for controllers.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for generating an integrated aircraft clearance, the method comprising:
    retrieving, by a processor unit, flight information, environmental information, and constraints from a number of sources, wherein the flight information includes at least one of flight plan information, flight scheduling information, and flight status information;
    retrieving, by the processor unit, preference information provided by at least one of the aircraft and an airline, wherein the preference information comprises preferences for at least one of speed, arrival time, and route;
    processing, by the processor unit, the flight information against the preference information to identify a clearance solution comprising a preferred route and a preferred speed for the aircraft; and
    modifying, by the processor unit, the clearance solution based on the environmental information and to satisfy the constraints.

2. The method of claim 1, wherein modifying the clearance solution further comprises:
    constraining the clearance solution within a metering window identifying a required spacing in time between aircraft at a meter fix.

3. The method of claim 1, wherein processing the flight information against the preference information to identifying the clearance solution comprises selecting a combination of route and speed for the aircraft that most closely matches the preferences.

4. The method of claim 1, wherein the environmental information further comprises at least one of weather information, wind speed and direction, runway availability, and airspace definition.

5. The method of claim 1, wherein modifying the clearance solution further comprises:
    determining whether the preferred route is available; and
    responsive to a determination that the preferred route is not available, selecting alternate routing from configuration data.

6. The method of claim 5 further comprising:
    responsive to a determination that the preferred route is available, selecting the preferred route.

7. The method of claim 1, wherein modifying the clearance solution further comprises:
    determining whether a preferred cruising flight level is available; and
    responsive to a determination that the preferred cruising flight level is not available, selecting an alternate cruising flight level from configuration data.

8. The method of claim 1, wherein modifying the clearance solution further comprises:
    determining whether the preferred speed is within air traffic control limits and aircraft performance limits.

9. The method of claim 1, wherein modifying the clearance solution further comprises:
    determining whether the preferred route traverses unavailable airspace; and
    responsive to a determination that the preferred route traverses the unavailable airspace, selecting alternate routing.

10. The method of claim 1, wherein modifying the clearance solution further comprises:
    determining whether the clearance solution should be derived using a required time of arrival function;
    responsive to a determination that the clearance solution should be derived using the required time of arrival function, determining whether the aircraft has requested a specific required time of arrival; and
    responsive to a determination that the aircraft has not requested the specific required time of arrival, making a controlled time of arrival the required time of arrival.

11. A method for generating an integrated aircraft clearance, the method comprising:
    retrieving, by a processor unit, flight information, preference information, environmental information, and constraints from a number of sources, wherein the flight information includes at least one of flight plan information, flight scheduling information, and flight status information;
    processing, by the processor unit, the flight information against the preference information, the environmental information, and the constraints;
    generating, by the processor unit, a clearance solution for an aircraft based on the flight information, the preference information, the environmental information and the constraints;
    wherein processing the flight information against the preference information further comprises determining whether preferred speeds are within air traffic control limits and aircraft performance limits; and
    responsive to a determination that the preferred speeds are not within air traffic control limits, clipping the preferred speeds to air traffic control limits within aircraft performance limits.

12. The method of claim 11 further comprising:
    responsive to a determination that the preferred speeds are within air traffic control limits, requesting a trajectory from a trajectory predictor.

13. A method for generating an integrated aircraft clearance, the method comprising:
    retrieving, by a processor unit, flight information, preference information, environmental information, and constraints from a number of sources, wherein the flight information includes at least one of flight plan information, flight scheduling information, and flight status information;
    processing, by the processor unit, the flight information against the preference information, the environmental information, and the constraints;
    generating, by the processor unit, a clearance solution for an aircraft based on the flight information, the preference information, the environmental information and the constraints;
    wherein processing the flight information against the preference information further comprises:
    determining whether a clearance should be generated using metering optimization; and
    responsive to a determination that the clearance should be generated using metering optimization, determining a dynamic metering window that expresses available runway and airspace resources for a flight in order to perform the metering optimization.

14. A method for generating an integrated aircraft clearance, the method comprising:
    retrieving, by a processor unit, flight information, preference information, environmental information, and constraints from a number of sources, wherein the flight information includes at least one of flight plan information, flight scheduling information, and flight status information;
    processing, by the processor unit, the flight information against the preference information, the environmental information, and the constraints;
    generating, by the processor unit, a clearance solution for an aircraft based on the flight information, the preference information, the environmental information and the constraints;
    wherein processing the flight information against the preference information further comprises:
    determining whether clearance should be derived using a required time of arrival function;
    responsive to a determination that the clearance should be derived using the required time of arrival function, determining whether the aircraft has requested a specific required time of arrival;
    responsive to a determination that the aircraft has not requested the specific required time of arrival, making a controlled time of arrival the required time of arrival;
    responsive to a determination that the aircraft has requested the specific required time of arrival, constraining the required time of arrival to a meter window;
    calculating a speed necessary to meet the controlled time of arrival;
    determining whether the speed is within performance limits of the aircraft;
    responsive to a determination that the speed is within performance limits of the aircraft, performing conflict detection; and
    making a clearance available to a flight object manager.

15. The method of claim 14 further comprising:
    responsive to a determination that the speed is not within performance limits of the aircraft, finding speed and route combinations by iteratively calling a trajectory predictor;
    selecting a speed and route combination from the speed and route combinations provided by the trajectory predictor using the preference information retrieved;

performing conflict detection; and making a clearance available to a flight object manager.

16. A system for generating an integrated aircraft clearance, the system comprising:
   a flight object manager configured to collect flight information and preference information, wherein the flight information includes at least one of a number of flight plans, a number of flight schedules, and flight status information, and wherein the preference information includes at least one of airline preference and aircraft preference; and
   a clearance generator in communication with the flight object manager and configured to receive the flight information and the preference information along with environmental information, identify a number of constraints and a number of preferences associated with a flight, and generate a number of solutions.

17. The system of claim 16, wherein the preference information includes a number of preferences for at least one of routing, speed schedules, arrival time, and fuel efficiency.

18. The system of claim 16 further comprising:
   a trajectory predictor in communication with the clearance generator and configured to receive a function call from the clearance generator and generate a number of trajectory predictions for the clearance generator using the flight information and the constraints identified by the clearance generator.

19. An apparatus for generating an integrated aircraft clearance, the apparatus comprising:
   a metering manager configured to perform metering optimization by calculating a dynamic metering window identifying a required spacing in time between aircraft at a meter fix for a number of flights based on differences in speed of the aircraft for the number of flights; and
   a clearance generator configured to generate a clearance solution for the aircraft using the dynamic metering window.

20. The apparatus of claim 19, wherein the clearance generator is configured to generate the clearance solution for the aircraft based on flight information, preferences, environmental information, and constraints.

* * * * *